(12) United States Patent
Mitsuda

(10) Patent No.: US 7,400,557 B2
(45) Date of Patent: Jul. 15, 2008

(54) OPTICAL DISK RECORDING AND REPRODUCING APPARATUS

(75) Inventor: Hiroshi Mitsuda, Osaka (JP)

(73) Assignee: Funai Electric Co., Ltd. (JP)

( * ) Notice: Subject to any disclaimer, the term of this patent is extended or adjusted under 35 U.S.C. 154(b) by 501 days.

(21) Appl. No.: 11/090,291

(22) Filed: Mar. 28, 2005

(65) Prior Publication Data

US 2005/0219969 A1    Oct. 6, 2005

(30) Foreign Application Priority Data

Apr. 5, 2004    (JP)    ............... 2004-110942

(51) Int. Cl.
*G11B 7/00*    (2006.01)

(52) U.S. Cl. .................................. 369/44.11

(58) Field of Classification Search .............. None
See application file for complete search history.

(56) References Cited

U.S. PATENT DOCUMENTS

| | | | | |
|---|---|---|---|---|
| 4,637,005 A | * | 1/1987 | Naito et al. | 369/44.15 |
| 4,698,795 A | * | 10/1987 | Yoshio | 369/44.28 |
| 4,748,610 A | * | 5/1988 | Nakata et al. | 369/44.25 |
| 5,060,215 A | * | 10/1991 | Kawamura et al. | 369/44.35 |
| 5,136,566 A | * | 8/1992 | Iwazaki | 369/44.25 |
| 6,434,096 B1 | | 8/2002 | Akagi et al. | 369/44.32 |

FOREIGN PATENT DOCUMENTS

| | | |
|---|---|---|
| JP | 61-011944 | 1/1986 |
| JP | 01-082338 | 3/1989 |
| JP | 05-182206 | 7/1993 |
| JP | 08-138255 | 5/1996 |

* cited by examiner

*Primary Examiner*—William Korzuch
*Assistant Examiner*—Parul Gupta
(74) *Attorney, Agent, or Firm*—Bacon & Thomas, PLLC

(57) ABSTRACT

The present invention provides an optical disk recording and reproducing apparatus having a circuit configuration whereby it is possible to prevent tracking drive signals from being offset even when the temperature of a tracking actuator drive circuit is increased. The output resistance of a low-pass filter 15 is composed of two serially connected resistors R2*a* and R2*b*, the resistance of the former one R2*a* of the serially connected resistors R2*a* and R2*b* being arranged to be lower than that of the latter one R2*b* and a connecting point S between the former and latter resistors R2*a* and R2*b* being connected to the input side of an A/D port 6, whereby the potential difference between a tracking output port 12 and the A/D port 6 is reduced as much as possible, and thereby the reference voltage value stored in a reference voltage value storing means 9 approaches an exact value as close as possible, which increases the accuracy of comparison results of a comparing means 7 substantially, and therefore a D/A conversion and offset cancel circuit 10 can output a tracking drive signal without offset.

2 Claims, 4 Drawing Sheets

OPTICAL DISK RECORDING AND REPRODUCING APPARATUS

BACKGROUND OF THE INVENTION

1. Field of the Invention

The present invention relates to an optical disk recording and reproducing apparatus for recording information onto an optical disk and reproducing information recorded on an optical disk, and particularly to an optical disk recording and reproducing apparatus comprising a circuit for preventing a tracking drive signal from being offset.

2. Description of the Prior Art

In an optical disk reproducing apparatus, the tracking servo of an optical pickup is performed in accordance with a tracking error signal, and in more detail, with a track cross signal in which the pulse width is varied in accordance with the amount of shift (amount of shift to the radially inner or outer side of a track on an optical disk) of an objective lens provided in the optical pickup against a thread with the optical pickup mounted thereon.

For example, when the objective lens shifts to the radially inner side of a track on an optical disk, the tracking servo performs drive control based on a current track cross signal in such a manner as to put the objective lens back to its normal position against the track by applying a tracking drive voltage to a tracking actuator so that the objective lens is moved radially outward to be put back its normal position against the track. That is, the tracking error balance is corrected to be zero.

FIG. 3 is a block diagram illustrating the operation of an objective lens and a tracking actuator included in an optical pickup 30 which is provided in an optical disk recording and reproducing apparatus. In FIG. 3, the numeral 36 indicates a light source for emitting laser beam, where a laser beam emitted from the light source 36 passes through a hologram element 35 to be reflected at a mirror 34, and then is condensed by the objective lens 33 to spot-irradiate the recording surface of an optical disk 38. Then, a returning light beam reflected from the recording surface of the optical disk 38 is condensed by the objective lens 33 again to be reflected at the mirror 34, and then is divided into a plurality of light beam groups when passing through the hologram element 35 to enter multi-divided light receiving element groups 37. It is noted that the description about a focusing servo for focusing a laser beam onto the recording surface of the optical disk 38 is omitted here.

In the reflected light from the optical disk 38, which is then condensed by the objective lens 33, is contained +/−1st order light components diffracted by the track groove on the recording surface of the optical disk 38, first and second regions formed in a divided manner perpendicularly to the direction of the track groove on the surface of the hologram element 35 being positioned in such a manner as to correspond to regions modulated, respectively, by +1st and −1st order light components. The returning light beam passes through the first and second regions in the hologram element 35 to be divided in different directions, and then received by the multi-divided light receiving element groups 37 to be photoelectrically converted. Then, a tracking error detection circuit 39 selects suitable signals among signals separately output from the multi-divided light receiving element groups 37, and obtains the difference therebetween to generate a tracking error signal.

Next will be described the shift of the objective lens 33 against a thread (for moving the optical pickup 30 in the radial direction of the optical disk 38) not shown in the figure. A lens holder 32 with the objective lens 33 mounted thereon is supported movably onto the tracking actuator 31 so as to be movable in the radial direction (tracking direction) of the optical disk 38 against the thread. Therefore, the lens holder 32 is driven by the tracking actuator 31, where a tracking drive voltage is supplied to the tracking actuator 31 through a tracking actuator drive circuit 40 based on the tracking error signal output from the tracking error detection circuit 39 to perform tracking servo control.

In the case above, the lens holder 32, i.e., objective lens 33 shifts in the tracking direction with, for example, an eccentricity of the optical disk 38, where the optical disk 38 has a high rotational frequency (eccentricity frequency) of, for example, several to several tens of Hz, while the driving operation for the thread has a low frequency of, for example, 1 Hz. Therefore, in the case of tracking servo, since the objective lens 33 only follows the track groove on the optical disk 38, the objective lens 33 is to shift against the thread due to an eccentricity of the track groove.

FIG. 4 is a block diagram showing a circuit and a low-pass filter connected thereto for canceling the offset of focusing drive signals and tracking drive signals in a system LSI (Large Scale Integration) 1 provided in a conventional optical disk recording and reproducing apparatus.

It is noted that the system LSI 1 comprises, though not shown in the figure, an RF amplifier for amplifying RF signal, i.e., read-out signal from an optical pickup when reproducing an optical disk; a digital signal processing section for performing signal demodulation processing and error correction processing in accordance with the data format of the optical disk after converting an RF signal output from the RF amplifier into digital data and then storing the generated data in a RAM; a stream demultiplexing section for demultiplexing data stream output from the digital signal processing section into audio data, subpicture data and video data; a subpicture decoder for performing predetermined decode processing by inputting the subpicture data output from the stream demultiplexing section; a video decoder for performing predetermined decode processing by inputting the video data output from the stream demultiplexing section; a video processor for synthesizing data output from the video decoder and data output from the subpicture decoder; a video encoder for converting the synthesized data output from the video processor into a video signal for display to display an image on a display device; and a system controller for controlling the above-described components.

In FIG. 4, the system LSI 1 comprises: an A/D port 2 as an input port for receiving and analog/digital-converting a focusing drive signal, which is output to a focusing actuator drive circuit not shown in the figure, as a feedback signal; a reference voltage value storing means 4 for storing the digital voltage value of a first focusing drive signal input through the A/D port 2 as a reference voltage value; a reference voltage value storage control means 3 adapted to control in such a manner as to store the digital voltage value of the first focusing drive signal in the reference voltage value storing means 4 as a reference voltage value; a comparing means 5 for comparing the reference voltage value and the digital voltage value of a focusing drive signal input through the A/D port 2; a D/A conversion and offset cancel circuit 10 (including a circuit for performing the same processing as follows also for tracking drive signals) for digital/analog-converting a digital focusing drive signal generated based on a focusing error signal, which is input from the digital signal processing section not shown in the figure, into an analog focusing drive signal and for adjusting the analog focusing drive signal so as not to be offset in accordance with a comparison result of the comparing means 5 and then to be output; and a focusing output port 11 for outputting the analog focusing drive signal.

The system LSI 1 also comprises: an AMD port 6 as an input port for receiving and analog/digital-converting a tracking drive signal, which is output to the tracking actuator drive circuit 40 (refer to FIG. 3), as a feedback signal; a reference voltage value storing means 9 for storing the digital voltage value of a first tracking drive signal input through the A/D port 6 as a reference voltage value; a reference voltage value storage control means 8 adapted to control in such a manner as to store the digital voltage value of the first tracking drive signal in the reference voltage value storing means 9 as a reference voltage value; a comparing means 7 for comparing the reference voltage value and the digital voltage value of a tracking drive signal input through the A/D port 6; a D/A conversion and offset cancel circuit 10 for digital/analog-converting a digital tracking drive signal generated based on a tracking error signal, which is input from the digital signal processing section not shown in the figure, into an analog tracking drive signal and for adjusting the analog tracking drive signal so as not to be offset in accordance with a comparison result of the comparing means 7 and then to be output; and a tracking output port 12 for outputting the analog tracking drive signal.

The optical disk recording and reproducing apparatus also comprises a low-pass filter 13 for allowing only a low-frequency component of the analog focusing drive signal output from the focusing output port 11 to pass therethrough to be output as a focusing drive signal for the focusing actuator drive circuit and also to be fed back to the A/D port 2; and a low-pass filter 14 for allowing only a low-frequency component of the analog tracking drive signal output from the tracking output port 12 to pass therethrough to be output as a tracking drive signal for the tracking actuator drive circuit 40 (refer to FIG. 3) and also to be fed back to the A/D port 6.

Meanwhile, an output terminal of the above-mentioned low-pass filter 14 is connected with the tracking actuator drive circuit 40 and the A/D port 6 to output tracking drive signals, where when the temperature of the tracking actuator drive circuit 40 is increased due to its operation, tracking drive signals can be offset.

When the temperature of the tracking actuator drive circuit 40 is increased, the resistance of the circuit is also increased due to the temperature characteristics of resistors, transistors, etc. that constitutes the tracking actuator drive circuit 40, and thereby the coil current for the tracking actuator 31 (refer to FIG. 3) is reduced, resulting in a slowdown in the operation of the tracking actuator 31. In order to compensate for the reduction, a servo control section not shown in the figure functions in such a manner as to raise the voltage of tracking drive signals for the tracking actuator drive circuit 40.

However, since the currently set resistance of a feedback line L1 for tracking drive signals is high, that is, the resistance of a resistor R2 (e.g., 22KΩ) in the low-pass filter 14 is high, the reference voltage value of the reference voltage value storing means 9 that is set by a first tracking drive signal is lower than the original voltage value, whereby a tracking drive signal with a lower voltage value than that of the tracking drive signal that should originally be output to the tracking actuator drive circuit 40 is to be output from the low-pass filter 14.

Therefore as mentioned above, when the temperature of the tracking actuator drive circuit 40 is increased, the resistance of the circuit is also increased due to the temperature characteristics of resistors, transistors, etc. that constitutes the tracking actuator drive circuit 40, and thereby the coil current for the tracking actuator 31 (refer to FIG. 3) is reduced, resulting in a slowdown in the operation of the tracking actuator 31, and in order to compensate for the reduction, the servo control section not shown in the figure functions in such a manner as to raise the voltage of tracking drive signals for the tracking actuator drive circuit 40. Consequently, the voltage of tracking drive signals output from the low-pass-filter 14 is raised. However as shown in FIG.5, a tracking drive signal TD is to be offset as represented by OS, where performing recording and reproducing operations as it is suffers from troubles.

The prior art disclosed in Japanese Patent Laid-Open Publication No. Hei 8-138255 is adapted to switch the connection of resistors in accordance with pit regions or group regions on an optical disk to adjust the gain of focusing error signals or tracking error signals, but not adapted to prevent tracking drive signals from being offset when the temperature of the tracking actuator drive circuit is increased.

The prior art disclosed in Japanese Patent Laid-Open Publication No. Hei 5-182206 relates to focusing control, but not adapted to prevent tracking drive signals from being offset when the temperature of the tracking actuator drive circuit is increased.

The prior art disclosed in Japanese Patent Laid-Open Publication No. Sho 61-11944 is adapted to be capable of correcting an error in a focus deviation detection signal even if generated due to the temperature change in the apparatus, but not adapted to prevent tracking drive signals from being offset when the temperature of the tracking actuator drive circuit is increased.

SUMMARY OF THE INVENTION

The present invention has been made to solve the above-mentioned problems, and an object thereof is to provide an optical disk recording and reproducing apparatus having a circuit configuration whereby it is possible to prevent tracking drive signals from being offset even when the temperature of a tracking actuator drive circuit is increased.

In order to achieve the above-mentioned object, the invention according to claim 1 provides an optical disk recording and reproducing apparatus which comprises an optical pickup including an objective lens for focusing a laser beam onto a track on an optical disk and adapted to record and reproduce information optically onto and from the optical disk, and a tracking actuator drive circuit for driving a tracking actuator adapted to move the objective lens of the optical pickup slightly in the radial direction of the optical disk, the apparatus comprising: an input port for receiving and analog/digital-converting a tracking drive signal, which is output to the tracking actuator drive circuit, as a feedback signal; a reference voltage value storing means for storing the digital voltage value of a first tracking drive signal input through the input port as a reference voltage value; a comparing means for comparing the reference voltage value and the digital voltage value of a tracking drive signal input through the input port; a D/A conversion and offset cancel circuit for digital/analog-converting an input digital tracking drive signal into an analog tracking drive signal and for adjusting the analog tracking drive signal so as not to be offset in accordance with a comparison result of the comparing means and then to be output; a tracking output port for outputting the analog tracking drive signal; and a low-pass filter for allowing only a low-frequency component of the analog tracking drive signal output from the tracking output port to pass therethrough to be output as a tracking drive signal for the tracking actuator drive circuit and also to be fed back to the input port, wherein the output resistance of the low-pass filter is composed of two serially connected resistors, the resistance of the former one of the serially connected resistors being arranged to be lower than that of the latter one and a connecting point between the former and latter resistors being connected to the input side of the input port, and wherein a tracking drive signal is arranged to be input to the input port as a feedback signal through the connecting point.

In the arrangement above, when the optical disk recording and reproducing apparatus is loaded with an optical disk and, for example, skip-up processing is started to adjust the offset of the tracking actuator, a first tracking drive signal is output from the low-pass filter to be fed to the tracking actuator drive circuit and also to be input to the input port as a feedback signal. The first tracking drive signal input to the input port is converted into a digital signal, and the voltage value of the digital signal is stored into the reference voltage value storing means as a reference voltage value for tracking drive signals.

Then, a second tracking drive signal is also fed to the tracking actuator drive circuit and also to be input to the input port as a feedback signal. The second tracking drive signal input to the input port is converted into a digital signal, and then the voltage value of the second tracking drive signal and the reference voltage value stored in the reference voltage value storing means are compared in the comparing means. As a result of the comparison, in the case where the voltages have the same value, a third tracking drive signal is also fed to the tracking actuator drive circuit at the same voltage value, while in the case where the voltages have different values, the voltage value of an input tracking signal is arranged to be the reference voltage value in the D/A conversion and offset cancel circuit and then to be output. The same processing as above is to be performed also for subsequent fourth or more tracking drive signals.

In the case above, the D/A conversion and offset cancel circuit is adapted to digital/analog-convert the input digital tracking drive signal into an analog tracking drive signal and to adjust the analog tracking drive signal so as not to be offset in accordance with the comparison result of the comparing means and then to be output.

Meanwhile, the output resistance of the low-pass filter is composed of the two serially connected resistors, the resistance of the former one of the serially connected resistors being arranged to be lower than that of the latter one and the connecting point between the former and latter resistors being connected to the input side of the input port, whereby the potential difference between the tracking output port and the input port is reduced as much as possible, and thereby the reference voltage value stored in the reference voltage value storing means approaches an exact value as close as possible, which increases the accuracy of comparison results of the comparing means substantially. Therefore, the D/A conversion and offset cancel circuit operates in accordance with a highly accurate comparison result, and thereby can output a tracking drive signal without offset.

In accordance with the arrangement, the output resistance of the low-pass filter is composed of the two serially connected resistors, the resistance of the former one of the serially connected resistors being arranged to be lower than that of the latter one and the connecting point between the former and latter resistors being connected to the input side of the input port, whereby the potential difference between the tracking output port and the input port is reduced as much as possible, and thereby the reference voltage value stored in the reference voltage value storing means approaches an exact value as close as possible, which allows tracking drive signals not to be offset even when the temperature of the tracking actuator drive circuit is increased, resulting in highly accurate recording and reproducing operations.

The invention provides an optical disk recording and reproducing apparatus which comprises an optical pickup including an objective lens for focusing a laser beam onto a track on an optical disk and adapted to record and reproduce information optically onto and from the optical disk, and a tracking actuator drive circuit for driving a tracking actuator adapted to move the objective lens of the optical pickup slightly in the radial direction of the optical disk, the apparatus comprising: an input port for receiving and analog/digital-converting a tracking drive signal, which is output to the tracking actuator drive circuit, as a feedback signal; a reference voltage value storing means for storing the digital voltage value of a first tracking drive signal input through the input port as a reference voltage value; a comparing means for comparing the reference voltage value and the digital voltage value of a tracking drive signal input through the input port; a D/A conversion and offset cancel circuit for digital/analog-converting an input digital tracking drive signal into an analog tracking drive signal and for adjusting the analog tracking drive signal so as not to be offset in accordance with a comparison result of the comparing means and then to be output; a tracking output port for outputting the analog tracking drive signal; and a low-pass filter for allowing only a low-frequency component of the analog tracking drive signal output from the tracking output port to pass therethrough to be output as a tracking drive signal for the tracking actuator drive circuit and also to be fed back to the input port, wherein a reference voltage value, with which a tracking drive signal output from the D/A conversion and offset cancel circuit cannot be offset even when the temperature of the tracking actuator drive circuit is increased, is stored in the reference voltage value storing means.

In the arrangement above, when the optical disk recording and reproducing apparatus is loaded with an optical disk and, for example, skip-up processing is started to adjust the offset of the tracking actuator, a first tracking drive signal is output from the low-pass filter to be fed to the tracking actuator drive circuit and also to be input to the input port as a feedback signal. The first tracking drive signal input to the input port is converted into a digital signal, and the voltage value of the digital signal is stored in the reference voltage value storing means as a reference voltage value for tracking drive signals.

Then, a second tracking drive signal is also fed to the tracking actuator drive circuit and also to be input to the input port as a feedback signal. The second tracking drive signal input to the input port is converted into a digital signal, and then the voltage value of the second tracking drive signal and the reference voltage value stored in the reference voltage value storing means are compared in the comparing means. As a result of the comparison, in the case where the voltages have the same value, a third tracking drive signal is also fed to the tracking actuator drive circuit at the same voltage value, while in the case where the voltages have different values, the voltage value of an input tracking signal is arranged to be the reference voltage value in the D/A conversion and offset cancel circuit and then to be output. The same processing as above is to be performed also for subsequent fourth or more tracking drive signals.

The D/A conversion and offset cancel circuit is adapted to digital/analog-convert the input digital tracking drive signal into an analog tracking drive signal and to adjust the analog-tracking drive signal so as not to be offset in accordance with the comparison result of the comparing means and then to be output.

Meanwhile, the reference voltage value, with which a tracking drive signal output from the D/A conversion and offset cancel circuit cannot be offset even when the temperature of the tracking actuator drive circuit is increased, is stored in the reference voltage value storing means, whereby the reference voltage value approaches an exact value as close as possible, which increases the accuracy of comparison results of the comparing means substantially. Therefore, the D/A conversion and offset cancel circuit operates in accordance with a highly accurate comparison result, and thereby can output a tracking drive signal without offset.

In accordance with the arrangement, the reference voltage value, with which a tracking drive signal output from the D/A conversion and offset cancel circuit cannot be offset even when the temperature of the tracking actuator drive circuit is increased, is stored in the reference voltage value storing means, whereby the reference voltage value stored in the reference voltage value storing means approaches an exact value as close as possible, which allows tracking drive signals not to be offset even when the temperature of the tracking actuator drive circuit is increased, resulting in highly accurate recording and reproducing operations.

In the invention according to claim 3, in order to store a reference voltage value, with which a tracking drive signal output from the D/A conversion and offset cancel circuit cannot be offset even when the temperature of the tracking actuator drive circuit is increased, in the reference voltage value storing means, the circuit of the optical disk recording and reproducing apparatus of the invention according to claim 2 is configured in such a manner that the potential difference between a feedback point in the low-pass filter for extracting a feedback signal from the low-pass filter and the input side of the input port is reduced, which allows the reference voltage value stored in the reference voltage value storing means to approach an exact value as close as possible.

In the invention according to claim 4, in order to reduce the potential difference between the feedback point in the low-pass filter for extracting a feedback signal from the low-pass filter and the input side of the input port, the circuit of the optical disk recording and reproducing apparatus of the invention according to claim 3 is configured in such a manner that the output resistance of the low-pass filter is composed of two serially connected resistors, the resistance of the former one of the serially connected resistors being arranged to be lower than that of the latter one and a connecting point between the former and latter resistors being connected to the input side of the input port, and wherein a tracking drive signal is arranged to be input to the input port as a feedback signal through the connecting point, whereby the potential difference between the tracking output port and the input port is reduced as much as possible, which allows the reference voltage value stored in the reference voltage value storing means to approach an exact value as close as possible.

As described heretofore, in accordance with the present invention, the output resistance of the low-pass filter is composed of the two serially connected resistors, the resistance of the former one of the serially connected resistors being arranged to be lower than that of the latter one and the connecting point between the former and latter resistors being connected to the input side of the input port, whereby the potential difference between the tracking output port and the input port is reduced as much as possible, and thereby the reference voltage value stored in the reference voltage value storing means approaches an exact value as close as possible, resulting in a highly accurate offset adjustment by the D/A conversion and offset cancel circuit. It is therefore possible to prevent tracking drive signals from being offset even when the temperature of the tracking actuator drive circuit is increased, resulting in highly accurate recording and reproducing operations.

Also in accordance with the present invention, the reference voltage value, with which a tracking drive signal output from the D/A conversion and offset cancel circuit cannot be offset even when the temperature of the tracking actuator drive circuit is increased, is adapted to be stored in the reference voltage value storing means, whereby the reference voltage value stored in the reference voltage value storing means approaches an exact value as close as possible, resulting in a highly accurate offset adjustment by the D/A conversion and offset cancel circuit. It is therefore possible to prevent tracking drive signals from being offset even when the temperature of the tracking actuator drive circuit is increased, resulting in highly accurate recording and reproducing operations.

DESCRIPTION OF THE PREFERRED EMBODIMENTS

Figure 1:
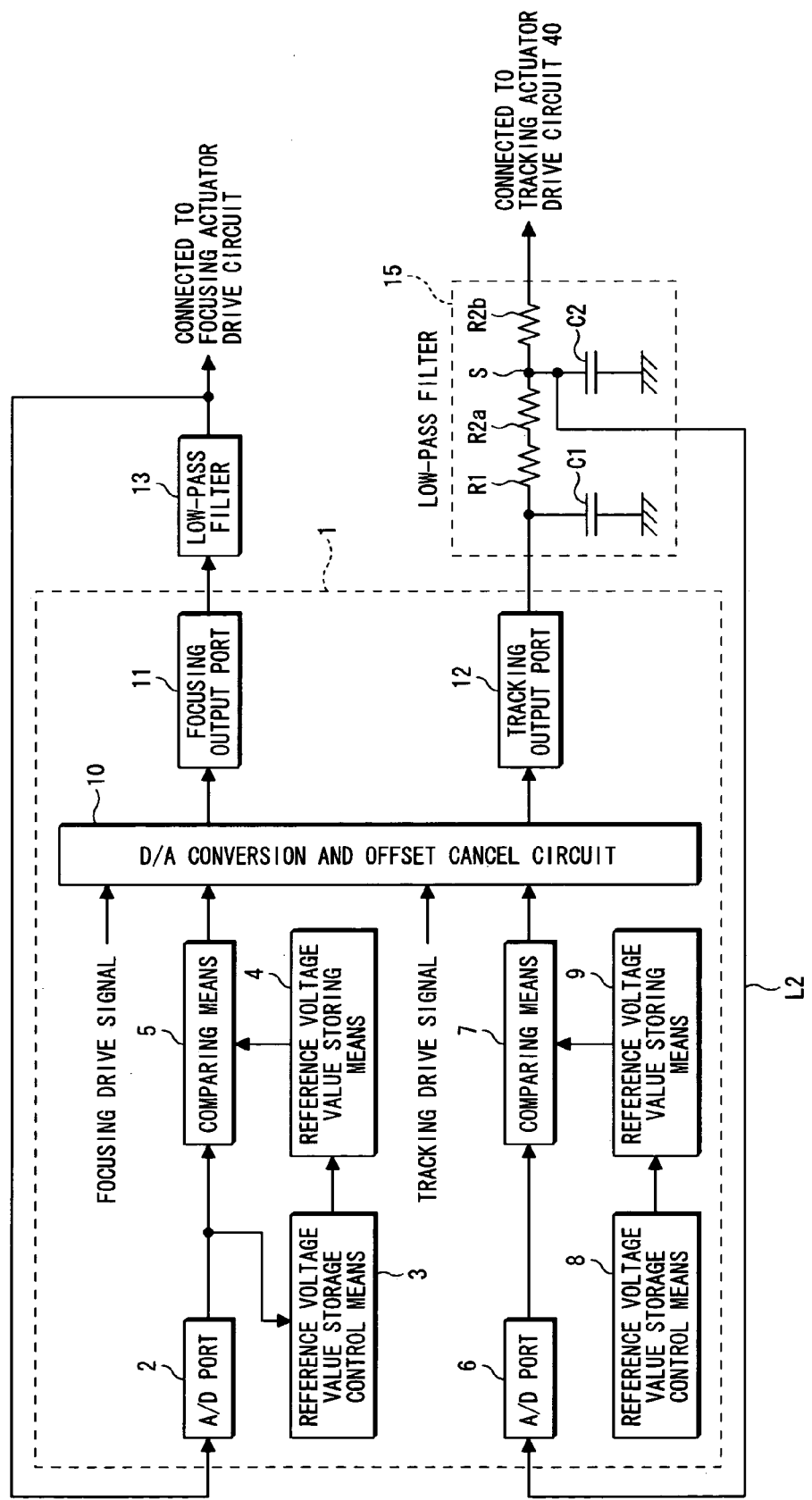
FIG. 1 is a block diagram showing a circuit and a low-pass filter connected thereto for canceling the offset of focusing drive signals and tracking drive signals in a system LSI provided in an optical disk recording and reproducing apparatus according to an embodiment of the present invention.
Figure 4:
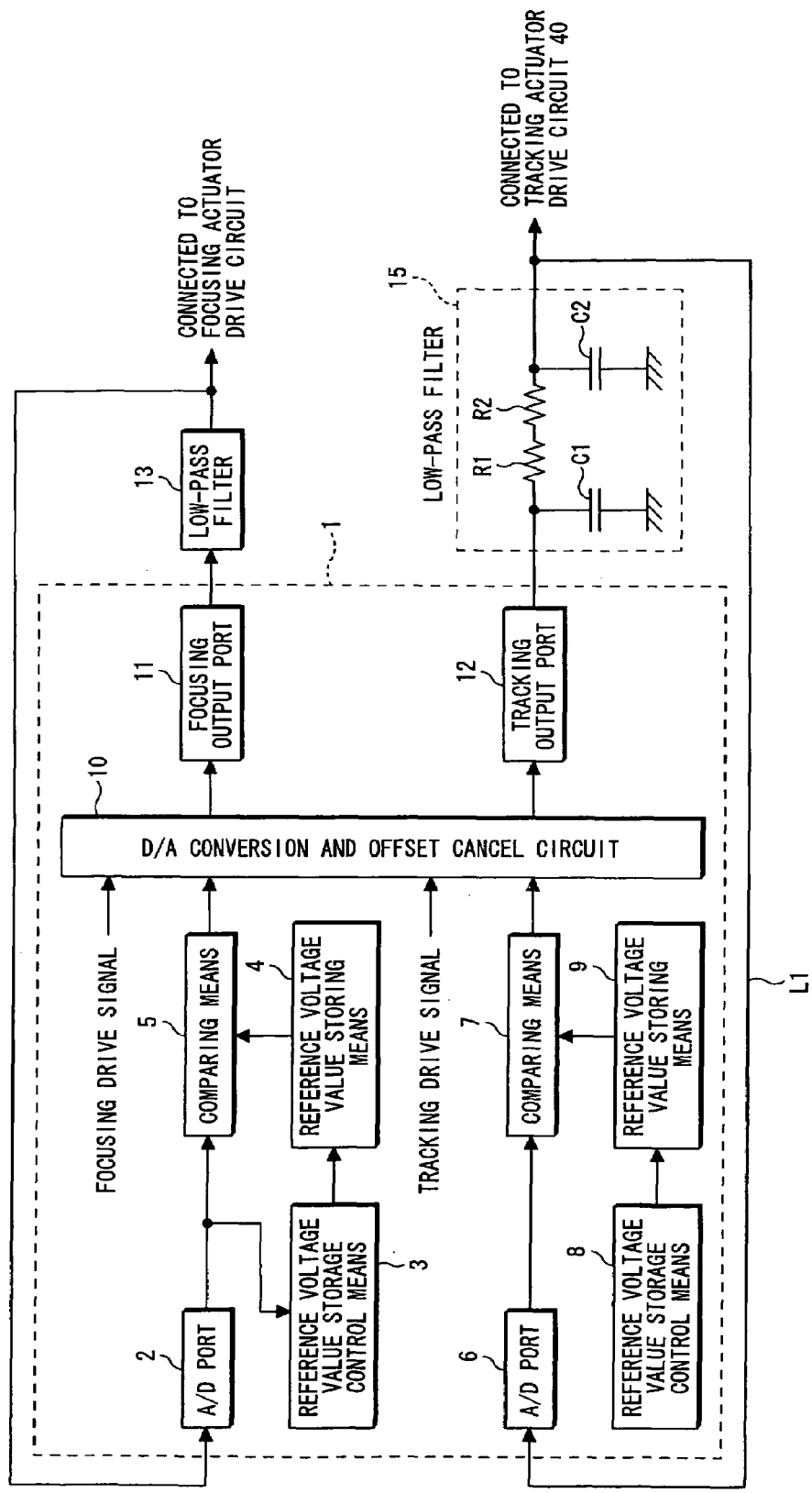
FIG. 4 is a block diagram showing a circuit and a low-pass filter connected thereto for canceling the offset of focusing drive signals and tracking drive signals in a system LSI provided in a conventional optical disk recording and reproducing apparatus.
Figure 5:
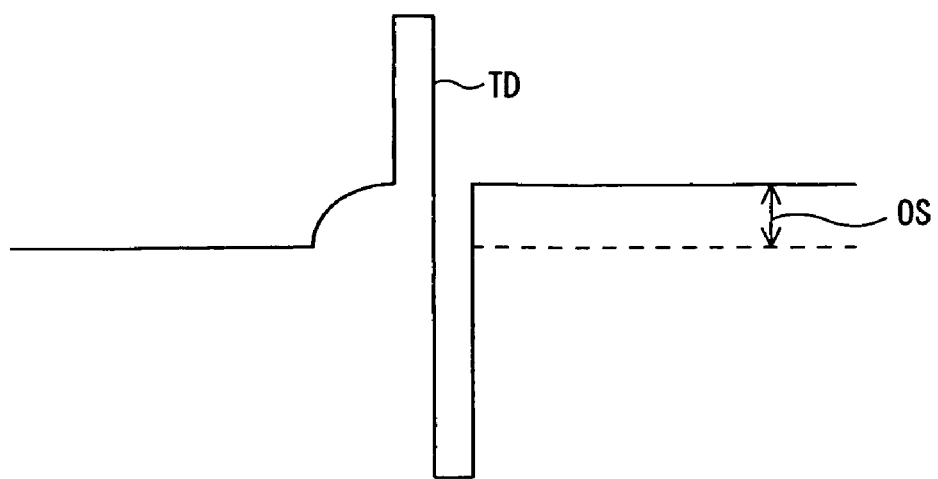
FIG. 5 is a waveform diagram of a tracking drive signal which emerges as a problem in the conventional optical disk recording and reproducing apparatus.

An embodiment of the present invention will hereinafter be described with reference to the accompanying drawings. FIG. 1 is a block diagram showing a circuit and a low-pass filter connected thereto for canceling the offset of focusing drive signals and tracking drive signals in a system LSI 1 provided in an optical disk recording and reproducing apparatus according to the embodiment of the present invention. In FIG. 1, components corresponding to those shown in FIG. 4 are designated with the same numeral references to omit the description thereof.

In FIG. 1, the numeral 15 indicates a low-pass filter characterizing the present embodiment, comprising capacitors C1 and C2, and resistors R1, R2a and R2b. One end of the capacitor C1 is grounded, while the other end is connected to one end of the resistor R1 and also to an output terminal of the tracking output port 12. The other end of the resistor R1 is connected to one end of the resistor R2a, the other end of which being connected to one end of the resistor R2b and also to one end of the capacitor C2. The other end of the resistor R2b is connected to an input terminal of the tracking actuator drive circuit 40 (refer to FIG. 3), and the other end of the capacitor C2 is grounded. A connecting point S between the resistors R2a and R2b is connected to an input terminal of the A/D port 6 through a line L2. It is noted that one end of the capacitor C2 may be connected to the output side of the resistor R2b.

Figure 3:
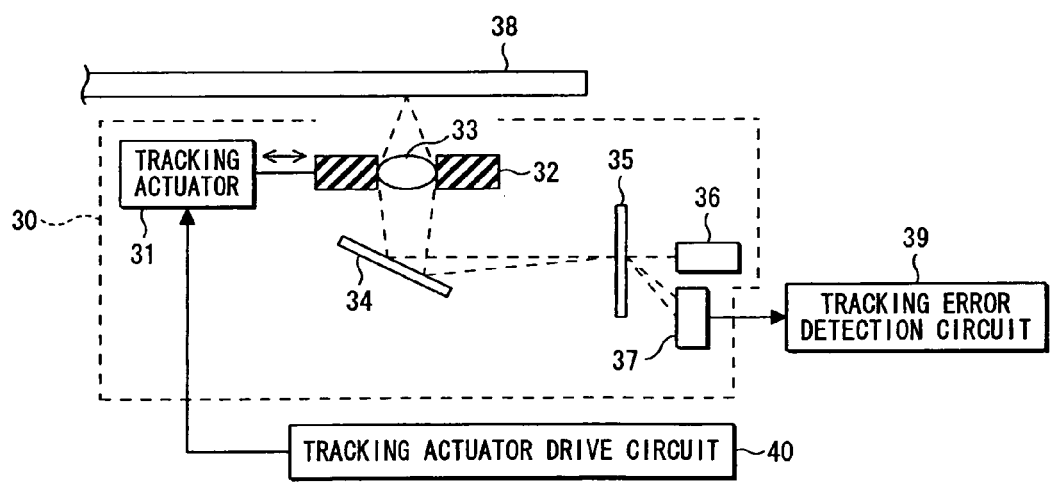
FIG. 3 is a block diagram illustrating the operation of an objective lens and a tracking actuator included in an optical pickup which is provided in an optical disk recording and reproducing apparatus.

Here will be described the offset adjustment for preventing tracking drive signals from being offset. As shown in FIG. 3, when the optical disk recording and reproducing apparatus is loaded with an optical disk 38 and, for example, skip-up processing is started to adjust the offset of the tracking actuator 31, a first tracking drive signal is output from the low-pass filter 15 shown in FIG. 1 to be fed to the tracking actuator drive circuit 40 and also to be input to the A/D port 6 as a feedback signal. The first tracking drive signal input to the A/D port 6 is converted into a digital signal, and the voltage value of the digital signal is stored in the reference voltage value storing means 9 as a reference voltage value for tracking drive signals.

Then, a second tracking drive signal is also fed to the tracking actuator drive circuit 40 and also to be input to the A/D port 6 as a feedback signal. The second tracking drive signal input to the A/D port 6 is converted into a digital signal, and then the voltage value of the second tracking drive signal and the reference voltage value stored in the reference voltage value storing means 9 are compared in the comparing means 7. As a result of the comparison, in the case where the voltages have the same value, a third tracking drive signal is also fed to the tracking actuator drive circuit 40 at the same voltage value, while in the case where the voltages have different values, the voltage value of an input tracking signal is arranged to be the reference voltage value in the D/A conversion and offset cancel circuit 10 and then to be output. The same processing as above is to be performed also for subsequent fourth or more tracking drive signals.

The D/A conversion and offset cancel circuit 10 is adapted to digital/analog-convert the input digital tracking drive signal into an analog tracking drive signal and for adjusting the analog tracking drive signal so as not to be offset in accordance with a comparison result of the comparing means 7 and then to be output.

Figure 2:
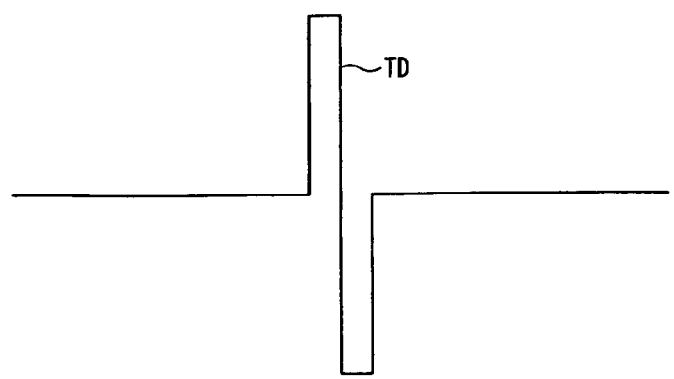
FIG. 2 is a waveform diagram of a tracking drive signal obtained in the embodiment.

Meanwhile, the output resistance of the low-pass filter 15 (the resistor R2 with a resistance of e.g. 22KΩ provided in the conventional low-pass filter 14 in FIG. 4) is composed of the two serially connected resistors R2a and R2b, the resistance of the former one R2a (e.g., 2KΩ) of the serially connected resistors R2a and R2b being arranged to be lower than that of the latter one R2b (e.g., 20KΩ) and the connecting point S between the former and latter resistors R2a and R2b being connected to the input terminal of the A/D port 6 through the line L2, whereby the potential difference between the tracking output port 12 and the A/D port 6 is reduced as much as possible, and thereby the reference voltage value stored in the reference voltage value storing means 9 approaches an exact value as close as possible, which increases the accuracy of comparison results of the comparing means 7 substantially. Therefore, the D/A conversion and offset cancel circuit 10 operates in accordance with a highly accurate comparison result, and thereby can output a tracking drive signal TD without offset as shown in FIG. 2.

In accordance with the embodiment, the output resistance of the low-pass filter 15 is composed of the two serially connected resistors R2a and R2b, the resistance of the former one R2a of the serially connected resistors R2a and R2b being arranged to be lower than that of the latter one R2b and the connecting point S between the former and latter resistors R2a and R2b being connected to the input terminal of the A/D port 6, whereby the potential difference between the tracking output port 12 and the A/D port 6 is reduced as much as possible, and thereby the reference voltage value stored in the reference voltage value storing means 9 approaches an exact value as close as possible, resulting in a highly accurate offset adjustment by the D/A conversion and offset cancel circuit 10. It is therefore possible to prevent tracking drive signals from being offset even when the temperature of the tracking actuator drive circuit 40 is increased, resulting in highly accurate recording and reproducing operations.

What is claimed is:

1. An optical disk recording and reproducing apparatus which comprises an optical pickup including an objective lens for focusing a laser beam onto a track on an optical disk and adapted to record and reproduce information optically onto and from said optical disk, and a tracking actuator drive circuit for driving a tracking actuator adapted to move said objective lens of said optical pickup slightly in the radial direction of said optical disk, the apparatus comprising:

an input port for receiving and analog/digital-converting a tracking drive signal, which is output to said tracking actuator drive circuit, as a feedback signal;

a reference voltage value storing means for storing the digital voltage value of a first tracking drive signal input through said input port as a reference voltage value;

a comparing means for comparing said reference voltage value and the digital voltage value of a tracking drive signal input through said input port;

a D/A conversion and offset cancel circuit for digital/analog-converting an input digital tracking drive signal into an analog tracking drive signal and for adjusting said analog tracking drive signal so as not to be offset in accordance with a comparison result of said comparing means and then to be output;

a tracking output port for outputting said analog tracking drive signal; and a low-pass filter for allowing only a low-frequency component of said analog tracking drive signal output from said tracking output port to pass therethrough to be output as a tracking drive signal for said tracking actuator drive circuit and also to be fed back to said input port, wherein the output resistance of said low-pass filter is composed of two serially connected resistors, the resistance of the former one of said serially connected resistors being arranged to be lower than that of the latter one and a connecting point between said former and latter resistors being connected to the input side of said input port, and wherein a tracking drive signal is arranged to be input to said input port as a feedback signal through said connecting point.

2. An optical disk recording and reproducing apparatus which comprises an optical pickup including an objective lens for focusing a laser beam onto a track on an optical disk and adapted to record and reproduce information optically onto and from said optical disk, and a tracking actuator drive circuit for driving a tracking actuator adapted to move said objective lens of said optical pickup slightly in the radial direction of said optical disk, the apparatus comprising: an input port for receiving and analog/digital-converting a tracking drive signal, which is output to said tracking actuator drive circuit, as a feedback signal; a reference voltage value storing means for storing the digital voltage value of a first tracking drive signal input through said input port as a reference voltage value; a comparing means for comparing said reference voltage value and the digital voltage value of a tracking drive signal input through said input port; a D/A conversion and offset cancel circuit for digital/analog-converting an input digital tracking drive signal into an analog tracking drive signal and for adjusting said analog tracking drive signal so as not to be offset in accordance with a comparison result of said comparing means and then to be output; a tracking output port for outputting said analog tracking drive signal; and a low-pass filter for allowing only a low-frequency component of said analog tracking drive signal output from said tracking output port to pass therethrough to be output as a tracking drive signal for said tracking actuator drive circuit and also to be fed back to said input port, wherein a reference voltage value, with which a tracking drive signal output from said D/A conversion and offset cancel circuit cannot be offset even when the temperature of said tracking actuator drive circuit is increased, is stored in said reference voltage value storing means; wherein in order to store a reference voltage value, with which a tracking drive signal output from said D/A conversion and offset cancel circuit cannot be offset even when the temperature of said tracking actuator drive circuit is increased, in said reference voltage value storing means, the circuit is configured in such a manner that the potential difference between a feedback point in said low pass filter for extracting a feedback signal from said low pass filter and the input side of said input port is reduced; wherein in order to reduce the potential difference between said feedback point in said low-pass filter for extracting a feedback signal from said low-pass filter and the input side of said input port, the circuit is configured in such a manner that the output resistance of said low-pass filter is composed of two serially connected resistors, the resistance of the former one of said serially connected resistors being arranged to be lower than that of the latter one and a connecting point between said former and latter resistors being connected to the input side of said input port, and wherein a tracking drive signal is arranged to be input to said input port as a feedback signal through said connecting point.

* * * * *